(12) United States Patent
Al-Mahshi et al.

(10) Patent No.: US 11,773,936 B2
(45) Date of Patent: Oct. 3, 2023

(54) BRAKE SYSTEM WITH DISTRIBUTING ASSEMBLY

(71) Applicant: AKEBONO BRAKE INDUSTRY CO., LTD., Tokyo (JP)

(72) Inventors: Waleed Mahmoud Al-Mahshi, Irvine, CA (US); Michio Suzuki, Kuki (JP)

(73) Assignee: AKEBONO BRAKE INDUSTRY CO., LTD, Tokyo (JP)

( * ) Notice: Subject to any disclaimer, the term of this patent is extended or adjusted under 35 U.S.C. 154(b) by 705 days.

(21) Appl. No.: 16/832,074

(22) Filed: Mar. 27, 2020

(65) Prior Publication Data

US 2020/0309214 A1 Oct. 1, 2020

Related U.S. Application Data

(60) Provisional application No. 62/825,930, filed on Mar. 29, 2019.

(51) Int. Cl.
| | | |
|---|---|---|
| *B60T 13/74* | (2006.01) |
| *F16D 65/18* | (2006.01) |
| *F16D 55/226* | (2006.01) |
| *F16D 121/24* | (2012.01) |
| *F16D 127/02* | (2012.01) |
| *F16D 125/50* | (2012.01) |
| *B60T 1/06* | (2006.01) |
| *F16D 125/40* | (2012.01) |

(52) U.S. Cl.
CPC ............ *F16D 65/183* (2013.01); *B60T 1/065* (2013.01); *B60T 13/746* (2013.01); *F16D 55/226* (2013.01); *F16D 2121/24* (2013.01); *F16D 2125/40* (2013.01); *F16D 2125/50* (2013.01); *F16D 2127/02* (2013.01)

(58) Field of Classification Search
CPC .............. F16D 65/183; F16D 2121/24; F16D 2125/40; F16D 2125/50; F16D 2127/02; B60T 1/065; B60T 13/746
See application file for complete search history.

(56) References Cited

U.S. PATENT DOCUMENTS

| | | |
|---|---|---|
| 9,476,469 B2 | 10/2016 | Gutelius |
| 9,587,692 B2 | 3/2017 | Gutelius |
| 2004/0192485 A1* | 9/2004 | Severinsson .......... F16D 65/568 475/149 |

(Continued)

*Primary Examiner* — Nicholas J Lane (74) *Attorney, Agent, or Firm* — The Dobrusin Law Firm, P.C.

(57) ABSTRACT

A brake system that includes a first brake piston and a second brake piston; a motor; a distributing assembly that includes a first output and a second output, and a deactivator. The distributing assembly distributes torque or power from the motor to the first brake piston via the first output and to the second brake piston via the second output. In a first operating configuration, the deactivator is inactive, and the distributing assembly distributes the torque or power to both of the first and second outputs such that a speed of the first output and the second output varies. In a second operating configuration, the deactivator is configured to deactivate the distributing assembly and the distributing assembly distributes the torque or power to both of the first output and the second output such that the speed of the first output and the second output is generally the same.

17 Claims, 4 Drawing Sheets

(56) References Cited

U.S. PATENT DOCUMENTS

| | | | | |
|---|---|---|---|---|
| 2015/0167761 | A1* | 6/2015 | Son | F16D 65/18 |
| | | | | 188/72.6 |
| 2015/0204402 | A1* | 7/2015 | Gutelius | F16D 65/22 |
| | | | | 188/162 |
| 2015/0354651 | A1* | 12/2015 | Park | F16D 55/228 |
| | | | | 188/72.1 |
| 2016/0215840 | A1* | 7/2016 | Chelaidite | F16D 55/226 |
| 2016/0290424 | A1* | 10/2016 | Gutelius | F16D 55/226 |
| 2017/0058979 | A1* | 3/2017 | Bahmata | F16D 65/18 |
| 2018/0135711 | A1* | 5/2018 | Chelaidite | F16D 65/18 |
| 2019/0063527 | A1* | 2/2019 | Thomas | F16D 55/226 |
| 2020/0309213 | A1* | 10/2020 | Al-Mahshi | F16D 65/18 |
| 2020/0309214 | A1* | 10/2020 | Al-Mahshi | F16D 55/228 |

* cited by examiner

BRAKE SYSTEM WITH DISTRIBUTING ASSEMBLY

PRIORITY

This application claims priority to U.S. 62/825,930 filed Mar. 29, 2019, the entire disclosure of which is hereby incorporated by reference herein for all purposes.

FIELD

These teachings relate to a brake system, and more particularly to a brake system with a distributing assembly for distributing torque or power to two or more outputs and brake pistons in the brake system.

BACKGROUND

Some vehicles utilize multi-piston brake systems brake systems having two or more brake pistons) to create a clamping force to slow, stop, and/or maintain a vehicle in a stopped or parked position, in many of these brake systems, multiple motors are used to move the multiple brake pistons to create and release the clamping force.

To improve braking performance, while also reducing weight, cost, and packaging space, it may be desirable in some vehicle platforms to have a brake system that includes a single motor that is configured to move the multiple brake pistons to create the clamping force, and then move the multiple brake pistons with the same, single motor to release the clamping force.

Examples of brake system are disclosed in U.S. Pat. Nos. 9,476,469 and 9,587,692, which are hereby incorporated by references herein for all purposes.

While creating and/or releasing the clamping force, it may be desirable to have a brake system that is configured to distribute torque or power between two or more brake pistons or outputs based on load or resistance differences acting on the brake pistons or output shafts.

For example, during a brake apply, it may be desirable for the distributing assembly to operate in an active condition where the distribution assembly is configured to distribute torque or power generally equally to or between the two or more brake pistons or outputs until one or more of the brake pistons or outputs experiences a higher load or resistance acting on it, and then distribute the torque from the motor to the brake piston or output shaft(s) with the lower resistance or load acting on it while reducing or eliminating the torque supply to the brake piston(s) or output shaft(s) with the higher load or resistance acting on it.

For example, during release of the brake apply, it may be desirable for the distributing assembly to be deactivated and operate in an inactive condition where the distributing assembly distributes torque or power generally equally to the two or more brake pistons or output shafts, regardless if one or more of the brake pistons or output shafts experiences a higher load or resistance acting on it compared to other brake pistons or output shafts.

SUMMARY

These teachings disclose a brake system that includes a single motor that is configured to move multiple brake pistons to create a clamping force, and then move multiple brake pistons with the same, single motor to release the clamping force These teachings disclose a brake system that includes a distributing assembly that operates in an active condition during one operating configuration of the brake system, and then can be deactivated during another operating configuration of the brake system.

These teachings disclose a distributing assembly that operates in an active condition where the distribution assembly is configured to distribute torque generally equally to or between two or more brake pistons or outputs until one or more of the brake pistons or output shafts experiences a higher load or resistance acting on it, and then the distributing assembly distributes the torque to the brake piston(s) or output shaft(s) with the lower resistance or load acting, on it while reducing or eliminating the torque supply to the brake pistons) or output shaft(s) with the higher load or resistance acting on it.

These teachings disclose a brake system that includes a distributing assembly that can be deactivated and operate in an inactive condition where the distributing assembly distributes torque generally equally to the two or more brake pistons or output shafts, regardless if one or more of the brake pistons or output shafts experiences a higher load or resistance acting on it compared to other brake pistons or output shafts.

DETAILED DESCRIPTION

These teaching provide a brake system. The brake system is a system or assembly for creating a clamping force. The brake system may function to, may be configured to, or may be adapted or enabled to create a clamping force to slow, stop, and/or maintain a vehicle in a stopped position.

The brake system may be an opposed brake system (i.e., a fixed caliper brake system) or a floating brake system (i.e., a floating caliper). The brake system may be a disc brake system. The brake system may be a drum brake system. The brake system may be a service brake system. The brake system may be a parking brake system.

The clamping force may be a force that, when coupled with a brake pad or brake shoe coefficient of friction, functions to decelerate, slow, stop, and/or prevent movement or rotation of a brake rotor, brake drum, and/or a vehicle. The clamping force may be created during a standard brake apply (i.e., a brake apply force). The clamping force may be created during a parking brake apply a parking brake force). The clamping force may be created for both a brake apply and a parking brake apply.

The brake system may include one or more brake pads, and a brake caliper supporting two or more brake pistons. During a brake apply, the two or more brake pistons may be moved towards and away from the one or more brake pads by pressurizing brake fluid. Additionally, or alternatively, during a brake apply, the two or more brake pistons and one or more brake pads may be moved with electromechanical elements to create clamping force. The electromechanical elements may include rotary to linear mechanisms, spindle, nut, motor, one or more gears, a distributing assembly, or a combination thereof.

The brake rotor may cooperate with the components of the brake system to create the clamping force. The brake rotor may include an inboard side and an opposing outboard side. The brake caliper may be arranged so that one or more brake pads are located at the inboard side of the brake rotor (i.e., inboard brake pads), and one or more brake pads are located at the outboard side of the brake rotor (i.e., outboard brake pads), or both.

The brake caliper may have two or more piston bores. Each piston bore may define a hollow region in the brake caliper configured to receive and support a corresponding brake piston. The piston bores can be located entirely on one side of the brake rotor (i.e., on an outboard or inboard side of the brake rotor), or on both sides of the brake rotor.

The brake system may have two or more brake pistons. The two or more brake pistons may function to move a brake pad, or a corresponding end of brake pad, towards the brake rotor to create the clamping force. The two or more brake pistons may be located on one side of the brake rotor, or one or more brake pistons may be located on each side of the brake rotor. For example, the brake system may include three or more brake pistons, four or more brake pistons, five or more brake pistons, etc.

During a brake apply, to decelerate slow, stop, or maintain a vehicle in a stopped or parked position, the brake pistons may be moved by pressurizing fluid, such as brake fluid. To release the clamping force or the brake apply, the brake piston can be moved by depressurizing the fluid.

During a brake apply, to decelerate slow, stop, or maintain a vehicle in a stopped or parked position, the brake pistons may be moved with one or more electromechanical mechanisms (e.g., with one or more rotary to linear mechanisms; spindles; nuts; motors, etc.).

The brake piston pocket may function to receive at least a portion of a corresponding rotary to linear mechanism. The brake piston pocket may be a cup or recess formed into an end of a brake piston. The brake piston pocket may include a bottom wall at the end or bottom of the brake piston pocket and an opposing open end. A gap may exist between the nut of the rotary to linear mechanism and a corresponding bottom wall. During a brake apply, the gap may be taken up by moving the rotary to linear mechanism towards the bottom wall. Once the gap is taken up, further movement of the nut or rotary to linear mechanism may cause the nut to press against the bottom wall and then move the brake piston and thus brake pad against the brake rotor to create the clamping force.

By moving the nut away from the bottom pocket wall, the brake piston may move in an oppose, release direction, so that the brake pad can then move away from the brake rotor to release the damping force.

The brake system may include one or more motors. One motor may be provided for each of the two or more brake pistons. Alternatively, one motor may be provided for more than two brake pistons. A gear train or other transfer mechanisms may be provided between the one or more motor and the brake pistons. The motor may be any motor for creating a force or torque or power. For example, the motor may be a DC motor, a brushless motor, a series-wound motor, a shunt wound motor, a compound wound motor, a separately exited motor, a servomotor, a stepping motor, or a permanent magnet motor. The motor may include one or more electrical leads for connecting the motor to a power source. Supplying power to the motor may cause the output shaft of the motor to rotate about an axis. The output shaft rotation may be adapted for an apply direction (to create a clamping force) and for a release direction (to release a clamping force).

The brake system may comprise one or more rotary to linear mechanisms. The one or more rotary to linear mechanisms may function to convert a torque or power output from the motor or distributing assembly into a linear or axial force to move the one or more brake pistons. The one or more rotary to linear mechanisms may be a high-efficiency device such as a ball screw, a roller screw, or a ball ramp, for example. The one or more rotary to linear mechanisms may be a low-efficiency device. The one or more rotary to linear mechanisms may generally include a spindle and a nut. In some configurations, the rotary to linear mechanism may comprise only a spindle that is directly connected to the brake piston and does not include a nut.

The spindle may be rotated in an apply direction and a release direction to apply and release the brake system brake, respectively. Rotation of the spindle may cause a nut that is threadably engaged with the spindle to move axially along an axis in an apply or release direction to move the brake pad towards or away from a brake rotor.

The nut may be moved axially along an axis that the spindle is configured to rotate about. For example, the nut and the spindle may be threadably engaged such that when the spindle is rotated by the motor or driving gear, the nut moves axially toward or away from a wall of the piston pocket. After contact between the nut and the piston pocket wall is made, further movement of the nut may result in movement of a brake piston and thus a brake pad, or a corresponding end of a brake pad towards a brake pad. The nut may be restricted or prevented from rotating about the axis along which it is configured to axially move.

The brake system may include one or more distributing assemblies. A distributing assembly may function to transfer or distribute an output torque or power from a motor or gear train to or amongst two or more outputs, output shafts, and/or brake pistons or rotary to linear mechanisms during a brake apply, a parking brake apply, or both to create a clamping force. The distributing assembly may function to transfer or distribute an output torque or power from a motor or gear train to or amongst two or more brake pistons, outputs, output shafts, or rotary to linear mechanism during a brake release, a parking brake release, or both to release a clamping force.

While creating the clamping force, the distributing assembly according to these teachings is configured to distribute or re-distribute torque or power between two or more brake pistons, outputs, or output shafts based on load or resistance differences acting on the two or more brake pistons. The load or resistance difference acting on the brake pistons or output shafts may be created or provided by tolerance variations of the various interacting components (i.e., brake piston inside caliper bore, seals interacting with brake piston, the thread engagement between the spindle and nut of rotary to linear stage mechanisms, one brake pad or one end of a brake pad contacting a brake rotor before another end of the brake pad contacting the rotor, etc.

The distributing assembly may be configured to distribute torque from the motor generally equally to both of the brake pistons or output shafts so that both of the brake pistons are moved generally together or in unison until a load or resistance on one of the brake pistons or output shafts becomes higher than the other brake piston or output shafts. The distributing assembly may then be configured to distribute power from the motor to the brake piston or output shaft with the lower resistance so that the brake piston or output shaft with the higher resistance slows or ceases to move.

For example, when one end of a brake pad contacts a brake rotor, the brake piston or output shaft associated with that end of the brake pad may experience an increase in load or resistance. Accordingly, the distributing assembly according to these teachings is configured to reduce a torque supply to that brake piston output shaft and then redistribute the torque supply to the other brake piston output shaft so that the other corresponding end of the brake pad is moved towards and into contact with the brake rotor. Accordingly, with these teachings, a single motor can be used to move multiple brake pistons to create a clamping force.

For example, uneven or different loads or forces acting on the brake pistons or output shafts may be a result of the friction material of the brake pad wearing unevenly, which means one end of the brake pad may contact the brake rotor and build clamping force before the other end contacts the brake rotor. The brake pistons or output shafts associated with the end of the brake pad that contacts and builds clamping force first will apply a greater reactive load or resistance on that brake piston or output shaft.

For example, uneven or different loads or forces acting on the brake pistons or output shafts may be a result of system degradation where one brake piston moves faster than another brake piston, which means one end of the brake pad may contact the brake rotor and build clamping force before the other end contacts the brake rotor. The brake pistons output shafts associated with the end of the brake pad that contacts and builds clamping force first will apply a greater reactive load or resistance on that brake piston or output shaft.

For example, uneven or different loads or forces acting on the brake pistons or output shafts may be a result of tolerance differences in the rotary to linear mechanisms, tolerance variations in the brake piston and caliper bores in which the brake piston is located. These variations may result in one brake piston moving faster or farther than another brake piston, which means one end of the brake pad may contact the brake rotor and build clamping force before the other end contacts the brake rotor. The brake pistons output shafts associated with the end of the brake pad that contacts and builds clamping force first will apply a greater reactive load or resistance on that brake piston output shaft.

For example, uneven or different loads or forces acting on the brake pistons or output shafts may be a result of uneven or warped brake rotor surfaces.

The brake system and/or the distributing assembly may be operable in one or more configurations or conditions. The brake system and/or the distributing assembly may be operable in an active condition and in an inactive condition. The active condition may be during a brake apply and/or a brake release. The inactive condition may be during a brake apply and/or a brake release. The active condition and the inactive condition may occur during the same brake apply or brake release one condition after another).

In or during the active condition, the torque distribution assembly is configured to distribute torque or power generally equally to or between the two or more brake pistons or outputs or output shafts so that a speed of movement or rotation of the outputs, output shafts, and/or brake pistons is generally the same. This may occur until one or more of the brake pistons or output shafts experiences a higher load or resistance acting on it, and then the distributing assembly is configured to distribute the torque or power from the motor to the brake piston(s) or output shaft(s) with the lower resistance or load acting on it while reducing or eliminating the torque supply to the brake piston(s) or output shaft(s) with the higher load or resistance acting on it. This may result in a speed of the outputs, output shafts, or brake pistons being different from one another.

In or during the inactive condition, the distributing assembly distributes torque or power generally equally to the two or more brake pistons, outputs or output shafts, regardless if one or more of the brake pistons or output shafts experiences a higher load or resistance acting on it compared to other brake pistons or output shafts. This means that a speed of rotation or movement of the outputs or output shafts, or brake pistons is generally or substantially the same.

The active condition may be during a brake apply and the inactive condition may be during release of the brake apply, or vice versa.

The brake system and/or the distributing assembly may be switched between operating in the inactive condition and the active condition with a deactivator. The deactivator may a device or mechanism that is configured to switch the system or assembly between the active condition and the inactive condition. The deactivator may function to override or turn off or deactivate the distributing assembly so that torque or power from the motor is supplied generally equally to the two or more brake pistons or output shafts or outputs. This means that distributing assembly does not distribute or supply the torque to the brake piston or output shaft with the lower load or resistance acting on it. This means that a speed of movement of the two or more brake pistons, outputs, or output shafts is generally the same.

The distributing assembly may include one or more inputs. An input may be an input gear, shaft with spline, a pully and belt, or other mechanism configured to receive a supply of torque from the motor and/or from one or more gears between the motor and the distributing assembly (e.g., a gear train).

The brake system may include one or more deactivators. The brake system may include one or more distributing assemblies. One or more deactivators may be provided for each distributing assembly. For example, in systems which have four brake pistons, the brake system may have two distributing assemblies providing and distributing power or torque between each of the two groups of the brake pistons. In such a setup, one or more deactivators may be provided for each distributing assembly. Some systems may have an odd number of brake pistons, for example: 3 brake pistons, 5 brake pistons, etc. A system that has an odd number of brake pistons, such as three brake pistons, may have two or more deactivators and both of the deactivators connect to one common brake piston, for example.

The deactivator may be a one way bearing or clutch that allows free rotation of an output shaft in one direction relative to a carrier but restricts or prevents the free rotation in another direction. The deactivator may be an anti-rotation clutch.

The deactivator may be a mechanism that applies friction or resistance to the distributing assembly. When the friction or efficiency between the multiple brake pistons and/or output shafts is smaller than the friction applied by the deactivator onto the distributing assembly, the distributing assembly will operate in an inactive condition and distribute torque from the motor generally equally to all brake pistons and/or output shafts. When a difference between friction or efficiency on the multiple brake pistons and/or output shafts is smaller than the friction applied by the deactivator onto the distributing assembly, the distributing assembly will operate in the active condition and distribute torque from the motor to the brake piston(s) and/or output shaft(s) that have a lower friction or resistance acting on them.

The additional friction may be applied onto one or more components of the distributing assembly, including the sun gears. However, the additional friction may be applied onto one or more other gears or mechanisms of the distributing assembly. For example, the additional friction may be applied onto one or more of the carriers or planet gears. The additional friction may be applied by a suitable material, such as metal or rubber.

In any of the conditions described herein, the rotary to linear mechanism may move at different speeds and/or distances. This may be advantageous to compensate for taper wear, unequal pad wear, and/or tolerance variations in the spindle, nut, brake piston, brake pad, etc. In some configurations, during any of the operating conditions described herein, the spindle of the rotary to linear mechanisms may turn or rotate in opposite directions, while still moving the nut in the same direction during a brake apply and release. This can be achieved by having at least one of the rotary to linear mechanisms reverse threaded between the spindle and nut.

Figure 1:
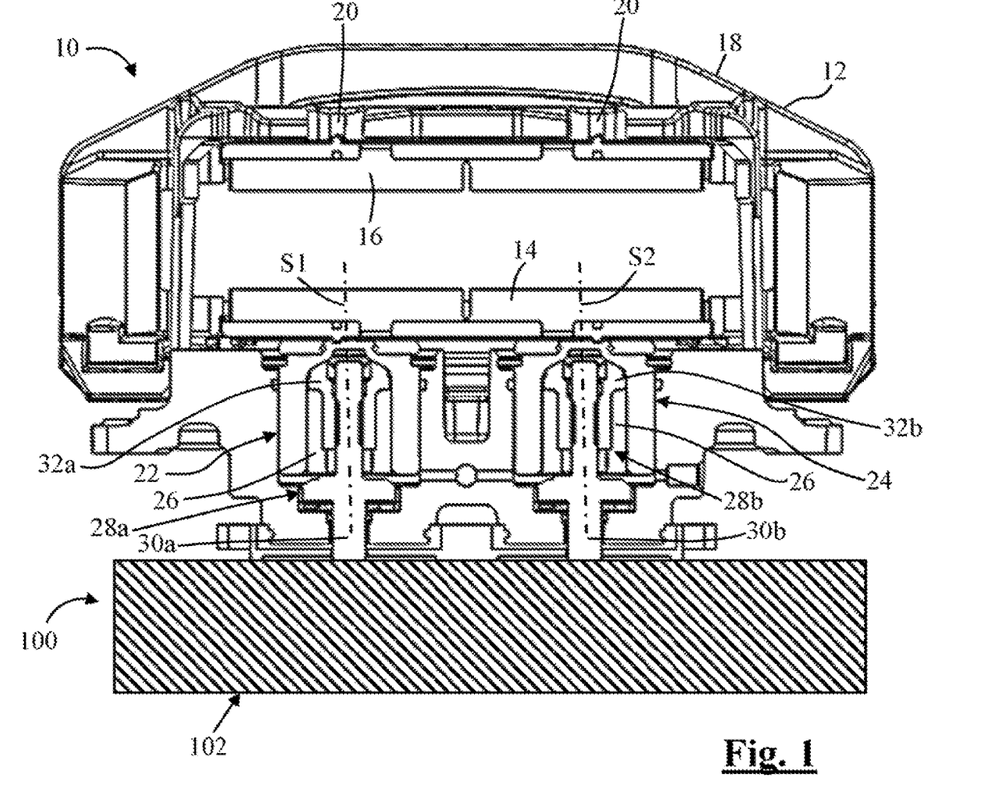
FIG. 1 is a cross-sectional view of a brake system.

FIG. 1 illustrates a brake system 10. The brake system 10 comprises a brake caliper 12 that is configured to support an inboard brake pad 14 and an opposing outboard brake pad 16. The brake caliper 12 comprises a bridge 18 having fingers 20.

The brake system 10 comprises a first brake piston 22 and a second brake piston 24. Each brake piston 22, 24 comprises a piston pocket 26. The brake system 10 comprises a rotary to linear stage mechanism 28a, 28b located at least partially inside of each piston pocket 26.

Each rotary to linear stage mechanism 28a, 28b comprises a spindle 30a, 30b and a nut 32a, 32b. Both spindles 30a, 30b are in rotational communication with a distributing assembly 100. The distributing assembly 100 is in communication with a motor 102. The motor 102 is configured to generate a torque or power output. The torque or power output may be an apply direction torque or power and a release direction torque or power. The distributing assembly 100 is configured to distribute or direct the torque or power from the motor 102 to one or both of the brake pistons 22, 24, and/or spindles 30a, 30b, and/or one or more outputs or output shafts.

As will be discussed further below, the torque or power from the motor 102 is configured to cause the spindles 30a, 30b to rotate about respective axis S1, S2 that the spindles 30a, 30b extend along. The spindles 30a, 30b are configured to rotate about the axis S1 and S2 in an apply direction during creation of the clamping force (by way of the apply direction torque supplied by the motor 102), and in a release direction during release of the clamping force (by way of the release direction torque supplied by the motor 102). Rotation of the spindles 30a, 30b about axis S1, S2 is configured to cause the corresponding nuts 32a, 32b to move axially along the respective axis S1, S2 in a corresponding apply and release direction. The nuts 32a, 32b are restricted or prevented from rotating about the respective axis S1, S2.

Figure 2:
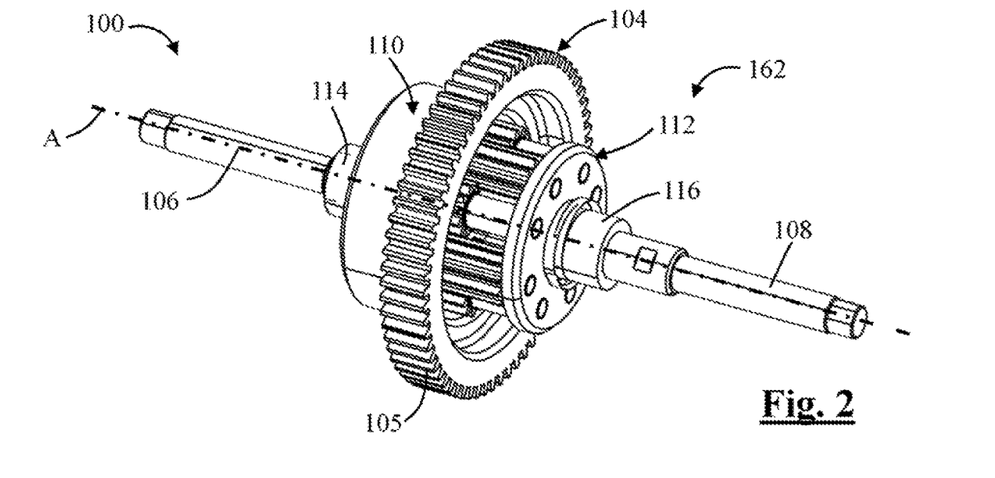
FIG. 2 is a perspective view of a distributing assembly for use with the brake system of FIG. 1.

FIG. 2 illustrates the distributing assembly 100. The distributing assembly 100 comprises an input gear 104 having a gear section 105 that is in communication with the motor 102 (FIG. 1) or a gear train that is provided between an output of the motor 102 and the gear section 105 of the input gear 104. The gear train may be configured to increase or decrease a torque or power output from the motor 102. By supplying an apply direction torque or power from the motor 102 to the distributing assembly 100, the input gear 104 is configured to rotate in an apply direction about axis A during creation of the clamping force. By supplying the release direction torque or power from the motor 102, the input gear 104 is configured to rotate in a release direction about axis A during release of the clamping force.

The distributing assembly 100 comprises a first output or output shaft 106 and a second output or output shaft 108. The outputs or output shafts 106, 108 are configured to rotate independently of one another. The outputs or output shafts 106, 108 extend along the axis A. However, in certain configurations, the outputs 106, 108 may be replaced with one or more gears or other transfer mechanisms. The outputs 106, 108 may be configured to be on the same side as the distributing assembly 100 or extend from different directions such as perpendicular to one another. In FIG. 2, the outputs 106, 108 extend from opposite sides of the distributing assembly 100 and extend along a common axis.

Each output or shaft 106, 108 is in rotational communication a corresponding spindle 30a, 30b (FIG. 1) of a corresponding rotary to linear stage mechanism 28a, 28b such that rotation of the output shaft 106, 108 in an apply or release direction about axis A causes the corresponding spindle 30a, 30b to rotate in a corresponding apply or release direction about the respective spindle axis S1, S2.

The distributing assembly 100 comprises a first carrier 110 and a second carrier 112. The first carrier 110 and the input gear 104 may be a single, integral component. This means that first carrier 110 is configured to rotate together with the input gear 104 about axis A in an apply and release direction when the input gear 104 is rotated via the motor 102 (FIG. 1) or gear train. In other configurations, the first carrier 110 and the input gear 104 may be discrete components that are connected together or otherwise configured to rotate together with the input gear 104.

The distributing assembly 100 comprises a deactivator 162. During a brake apply to create or generate the clamping force, the brake system 10 and/or the distributing assembly 100 is configured to operate in an active condition. During the brake apply configuration, the deactivator is inactive. During release of the brake apply or clamping force, the deactivator 162 is configured to deactivate the distributing assembly 100 so that the brake system 10 and/or distributing assembly 100 operates in an inactive condition.

For example, during a brake apply to create or generate the clamping force, the distributing assembly 100 is in an active condition and the deactivator is inactive and each output or axle 106, 108 is free to rotate independently and may rotate at different speeds of the other output axle 106, 108 depending on load or resistance differences acting on the brake pistons 22, 24. During release of the brake apply or clamping force, the deactivator 162 is configured to deactivate the distributing, assembly 100 so that the outputs or axles 106, 108 rotate together at the same speed about axis A, regardless of any load or resistance differences acting on the brake pistons 22, 24.

Active condition means that the brake system 10 and/or distributing assembly is configured to distribute torque or power from the motor 102 generally equally to or between the two brake pistons 22, 24 or output shafts 106, 108 until one the brake pistons 22, 24 or output shafts 106, 108 experiences a higher load or resistance acting on it, and then the distributing assembly 100 distributes the torque from the motor 102 to the brake piston 22, 24 or output shaft 106, 108 with the lower resistance or load acting on it, while reducing or eliminating the torque supply to the brake piston 22, 24 or output shaft 106, 108 with the higher load or resistance acting on it. During the active condition, the outputs 106, 108 may rotate at different speeds or rates, at least partially during the active condition.

After the distributing assembly 100 is deactivated via the deactivator 162, and the brake system 10 and/or distributing assembly 100 operates in the inactive condition, the distributing assembly 100 is configured to distribute torque or power from the motor 102 generally equally to or between the two brake pistons 22, 24 or output shafts 106, 108, regardless if one the brake pistons 22, 24 or output shafts 106, 108 experiences a higher load or resistance acting on it compared to other brake piston 22, 24 or output shaft 106, 108. During the inactive condition, the axles 106, 108 may rotate together as a solid axle. During the inactive condition, the outputs 106, 108 may rotate at generally the same speed or rate.

The deactivator 162 comprises a first clutch 114 and a second clutch 116.

Figure 3:
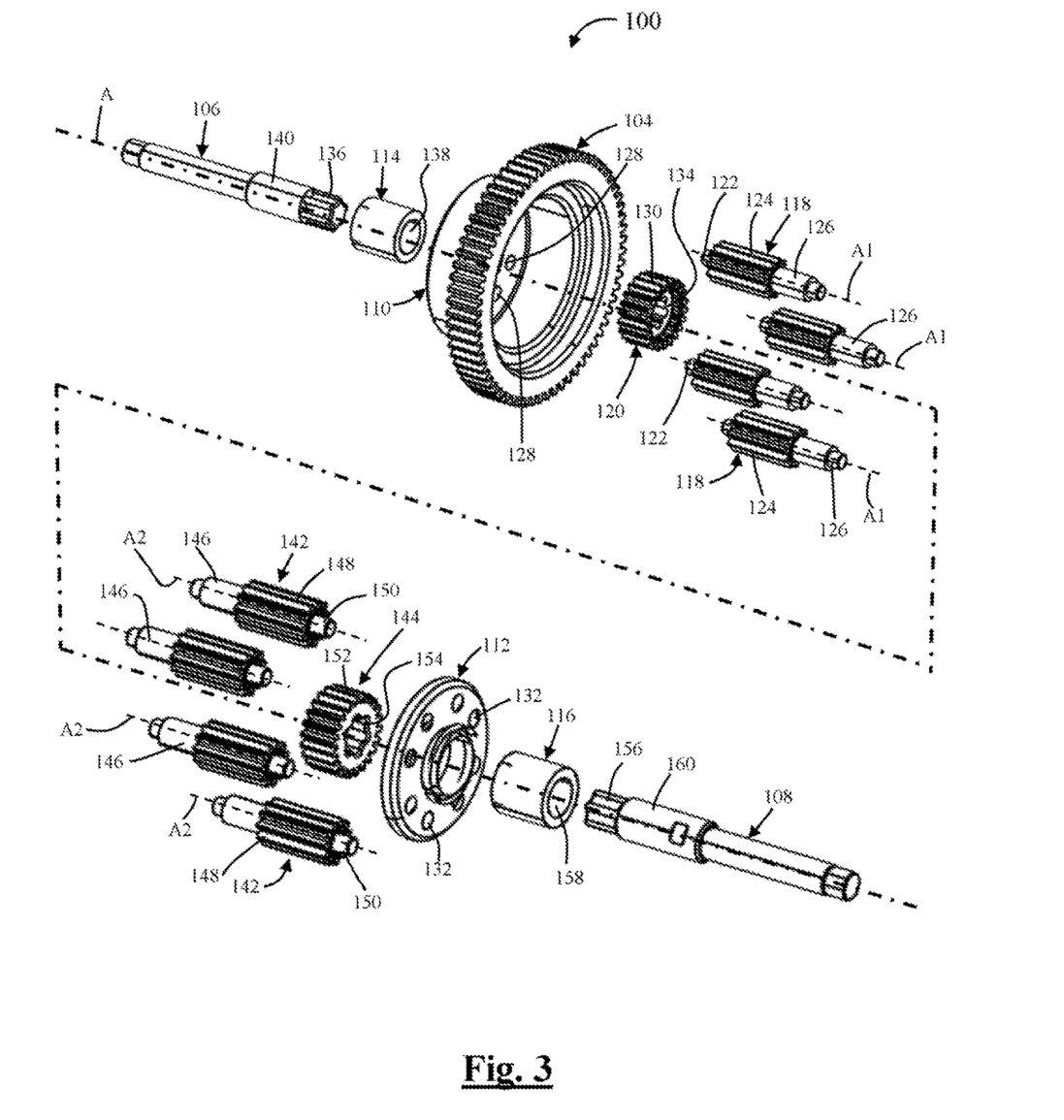
FIG. 3 is an exploded, perspective view of the distributing assembly of FIG. 2.

FIG. 3 further illustrates the distributing assembly 100. The distributing assembly 100 comprises a plurality of first planet gears 118 (4 illustrated) and a first sun gear 120.

Each of the first planet gears 118 extend along a first axis A1. Each of the first planet gears 118 comprise a first end 122, a first gear portion 124, and a second end 126.

The first end 122 of each first planet gear 118 is configured to engage a corresponding first bore 128 defined in the first carrier 110 and/or the input gear 104. The second end 126 of each first planet gear 118 is configured to engage a corresponding second bore 132 defined in the second carrier 112. The first gear portion 124 of each first planet gear 118 is configured to engage a gear portion 130 of the first sun gear 120 and also engage a second gear portion 148 of the second planet gears 142.

The first sun gear 120 comprises an engagement section 134 that is configured to engage a corresponding engagement section 136 of the first output shaft 106. By way of this engagement, rotation of the first sun gear 120 about axis A causes the first output shaft 106 to also rotate about axis A, which causes the first spindle 30a and nut 32a to move, as was previously discussed and also further discussed below.

The first clutch 114 of the deactivator 162 is configured to engage the first carrier 110 such that rotation of the first carrier 110 about axis A causes the first clutch 114 to rotate with the first carrier 110 about axis A. In other words, the first clutch 114 may be keyed or fixed to the first carrier 110 and will rotate with the first carrier 110 about axis A in both of the apply and release directions.

The first clutch 114 comprises an engagement section 138 that is configured to engage a corresponding engagement section 140 on the first output shaft 106. The engagement is such that the first output shaft 106 may rotate independently of the first clutch 114 in one direction about axis A, but the first clutch 114 rotates with the first output shaft 106 in another direction about axis A.

The deactivator 162 or the first clutch 114 may be a one-way mechanism, a one-way beating, a one-way clutch, an anti-reverse member or bearing, and/or a clutch bearing.

The deactivator 162 is configured to allow free rotation of the first output shaft 106 relative to the first carrier 110 in one direction about axis A when the distributing assembly 100 and/or brake system 10 is operating in the active condition during a brake apply or while creating the clamping force.

This means that during the active condition, the first output shaft 106 can rotate independently of the first carrier 110 about axis A.

The deactivator 162 is configured prevent the free rotation of the first output shaft 106 relative to the first carrier 110 in the opposite direction about axis A when the distributing assembly 100 and/or brake system 10 is operating in the inactive condition during a brake release or while releasing the clamping force. This means that during the inactive condition, the first output shaft 106 rotates together with the first carrier 110 about axis A.

The deactivator 162 is configured to allow free rotation or selective rotation of the second output shaft 108 relative to the second carrier 112 in one direction about axis A when the distributing assembly 100 and/or brake system 10 is operating in the active condition during a brake apply or while creating the clamping force.

The deactivator 162 is configured prevent the free rotation of the second output shaft 108 relative to the second carrier 112 in the opposite direction about axis A when the distributing assembly 100 and/or brake system 10 is operating in the inactive condition during a brake release or while releasing the clamping force.

Free rotation, or selective rotation, means that when the first carrier 110 is rotated about axis A, the first output shaft 106 may or may not rotate with the first carrier 110 about the axis A. As will be discussed further below, this means that the first output shall 106 will rotate with the first carrier 110 when the load or resistance acting on the first brake piston 22 or first output shaft 106 is less than or equal to the load or resistance acting on the second brake piston 24 or second output shaft 108. When the load or resistance acting on the first brake piston 22 or first output shaft 106 is greater than the load or resistance acting on the second brake piston 24 or second output shaft 108, the first output shaft 106 will slow or cease rotating with or relative to the first carrier 110.

Preventing the free rotation means that the first output shaft 106 will rotate together with the first carder 110 about the axis A, regardless of the load or resistance acting on the first brake piston 22 compared to the second brake piston 24.

The deactivator 162 may allow the free rotation or selective rotation of the output shafts 106, 108 during a brake apply while generating clamping force, and restrict or prevent the free rotation of the output shafts 106, 108 during a brake release while releasing the clamping force, or vice versa.

Stated another way, the deactivator 162 may allow the free rotation or selective rotation of the output shafts 106, 108 while the motor 102 is supplying the apply direction torque to the assembly 100, and restrict or prevent the free rotation of the output shafts 106, 108 while the motor 102 is supplying the release direction torque to the assembly 100

The distributing assembly 100 comprises a plurality of second planet gears 142 (4 illustrated) and a second sun gear 144.

Each of the second planet gears 142 extend along a second axis A2. Each of the second planet gears 142 comprise a first end 146, a second gear portion 148, and a second end 150.

The first end 146 of each second planet gear 142 is configured to engage a corresponding first bore 128 defined in the first carrier 110. The second end 150 of each second planet gear 142 is configured to engage a corresponding second bore 132 defined in the second carrier 112. The second gear portion 148 of each second planet gear 142 is configured to engage a gear portion 152 of the second sun gear 144 and also engage the first gear portion 124 of the first planet gears 118.

The second sun gear 144 comprises an engagement section 154 that is configured to engage a corresponding engagement section 156 of the second output shaft 108. By way of this engagement, rotation of the second sun gear 144 about axis A causes the second output shaft 108 to rotate about axis A.

The deactivator 162 or the second clutch 116 is configured to engage the second carrier 112 such that the second clutch 116 rotates with the second carrier 112 about axis A. In other words, the second clutch 116 may be keyed or fixed to the second carrier 112 and rotate with the second carrier 112 about axis A in both of the apply and release directions.

The second clutch 116 comprises an engagement section 158 that is configured to engage a corresponding engagement section 160 on the second output shaft 108.

The deactivator 162 or the second clutch 116 may be a one-way mechanism, a one-way bearing, a one-way clutch, an anti-reverse member or bearing, and/or a clutch bearing. The deactivator 162 or second clutch 116 is configured to allow free rotation or selective rotation of the second output shaft 108 relative to the second carrier 112 in one direction about axis A, and then prevent the free rotation of the second output shaft 108 relative to the second carrier 1112 in the opposite direction about axis A.

Free rotation, or selective rotation, means that when the second carrier 112 is rotated about axis A, the second output shaft 108 may or may not rotate with the second carrier 112 about the axis A. As will be discussed further below, this means that the second output shaft 108 will rotate with the second carrier 112 when the load or resistance acting on the second brake piston 24 or second output shaft 108 is less than or equal to the load or resistance acting on the first brake piston 22 or first output shaft 106. When the load or resistance acting on the second brake piston 24 or second output shaft 108 is greater than the load or resistance acting on the first brake piston 22 or first output shaft 106, the second output shaft 108 will slow or cease rotating with or relative to the second carrier 112.

Preventing the free rotation means that the second output shaft 108 will rotate with the second carrier 112 about the axis A, regardless of the load or resistance acting on the second brake piston 24 or second output shaft 108 compared to the first brake piston 22 or first output shaft 106.

Operation of the distributing assembly 100 will now be described with reference to FIGS. 1-3. The following description refers to creation of clamping force during a brake apply, during a situation where the load or resistance acting on both brake pistons 22, 24 and/or both output shafts 106, 108 is generally the same or balanced.

The motor 102 is turned ON, which causes the motor 102 to generate an apply direction torque or power. The apply direction torque or power is transferred from the motor 102 to the input gear 104, which causes the input gear 104 to rotate about the axis A in an apply direction. Rotation of the input gear 104 in the apply direction causes the first carrier 110 to rotate in the apply direction about axis A.

Rotation of the first carrier 110 about axis A causes the first and second planet gears 118, 142 and the second carrier 112 to rotate about axis A via the engagement of the ends 122, 146, 126, 150 of the first and second planet gears 118, 142 with the bores 128, 132 in the first and second carriers 110, 112.

Rotation of the first and second planet gears 118, 142 about axis A applies an apply direction torque on the corresponding sun gears 120, 144, which causes the sun gears 120, 144 to rotate about axis A in an apply direction.

Rotation of the sun gears 120, 144 about axis A causes the corresponding output shafts 106, 108 to rotate about axis A in the apply direction by way of the engagement between the sun gears 120, 144 and output shafts 106, 108 (i.e., 134, 136 and 154, 156).

Rotation of the first output shaft 106 the apply direction about axis A causes the first spindle 30a to rotate about the axis S1 in the apply direction by way of a suitable engagement between the first output shaft 106 and the first spindle 30a, such as a worm gear for example. Similarly, rotation of the second output shaft 108 the apply direction about axis A causes the second spindle 30b to rotate about the axis S2 in the apply direction by way of a suitable engagement between the second output shaft 108 and the second spindle 30b, such as a worm gear, for example.

Rotation of the first spindle 30a in the apply direction about axis S1 causes the first nut 32a to move axially along axis S1 in an apply direction by way of the threaded engagement between the first spindle 30a and the first nut 32a. The first nut 32a is restricted or prevented from rotating about axis S1. Similarly, rotation of the second spindle 30b in the apply direction about axis S2 causes the second nut 32b to move axially along axis S2 in an apply direction by way of the threaded engagement between the second spindle 30b and the second nut 32b. The second nut 32b is restricted or prevented from rotating about axis S2.

Axial movement of the first nut 32a in the apply direction causes the first nut 32a to move or push the first brake piston 22 in an apply direction, which then moves or pushes an end of the inboard brake pad 14 against the brake rotor to create the clamping force. Similarly, axial movement of the second nut 32b in the apply direction causes the second nut 32b to move or push the second brake piston 24 in an apply direction, which then moves or pushes an opposite end of the inboard brake pad 14 against the brake rotor to create the clamping force. An opposing reaction force is then generated, which causes the bridge 18 to move in an opposite direction, causing the fingers 20 to move or pull the outboard brake pad 16 into contact with the brake rotor. Contact between one or both of the brake pads 14, 16 and the brake rotor generates friction and the clamping force to slow, stop, or prevent movement of the brake rotor or road wheel of a vehicle.

Another operation of the distributing assembly 100 will now be described with continued reference to FIGS. 1-3. The following description refers to a situation during creation of clamping force during a brake apply, where the load or resistance acting on the brake pistons 22, 24 and/or output shafts 106, 108 is different or not balanced.

First, we will assume the load or resistance acting on the second brake piston 24 and/or second output shaft 108 is greater than the load or resistance acting on the first brake piston 22 and/or first output shaft 106. This condition may occur at the start of the brake apply and/or at any point in time during a brake apply and creation of the clamping force.

The apply direction torque or power from the motor 102 is transferred to the input gear 104, which causes the input gear 104 to rotate in an apply direction about axis A. Rotation of the input gear 104 causes the first carrier 110 to rotate in an apply direction about axis A.

Rotation of the first carrier 110 in an apply direction causes the first planet gears 118 to rotate in an apply direction about axis A by way of the engagement of the first ends 122 of the planet gears 118 with the bores 128 in the first carrier 110.

Rotation of the first planet gears 118 in the apply direction about axis A causes the first sun gear 120 to rotate in an apply direction about axis A by way of engagement between the gear portions 124 of the first planet gears 118 and the gear portion 130 of the first sun gear 120.

Rotation of the first sun gear 120 in the apply direction about axis A causes the first output or shaft 106 to rotate in an apply direction about axis A by way of engagement between the engagement section 134 of the first sun gear 120 and the engagement section 136 of the first output shaft 106.

Rotation of the first output or shaft 106 the apply direction about axis A causes the first spindle 30a to rotate about the axis S1 in the apply direction, which causes the first brake piston to move the end of the inboard brake pad 14 as was previously discussed.

Rotation of the input gear 104 in the apply direction also simultaneously causes the second carrier 112 and thus the second planet gears 142 to rotate in an apply direction about axis A. Again, this occurs by way of the engagement of the ends 122, 126 of the first planet gears 118 with the corresponding bores 128, 132 in the corresponding first and second carrier 110, 112, and the ends 146, 150 of the second planet gears 142 with the corresponding bores 128, 132 in the corresponding first and second carrier 110, 112.

Because the load or resistance acting on the second brake piston 24 or second output shaft 108 is greater than the load or resistance acting on the first brake piston 22 or first output shaft 106, the second output shaft 108 and thus the second sun gear 144 slow or cease to rotate. The slowing or ceasing of rotation of the second sun gear 144 causes the second planet gears 142 to spin about each of their corresponding axis A2, while the second planet gears 142 continue to rotate about axis A. By way of the engagement of the gear sections 124 on the first planet gears 118 and the gear sections 148 of the second planet gears 142, the first planet gears 118 also spin about their respective axis A1.

Accordingly, some or all of the apply direction torque that was previously supplied to the second output shaft 108 and brake piston 24 is distributed or redistributed or transmitted to the first output or shaft 106 and the first brake piston 22 to create the clamping force as was discussed above. This distribution of the apply direction torque may result in the first output and/or shaft 106 and brake piston 22 moving faster or having a different or faster speed compared to when the torque from the motor 102 is supplied generally equally to both output shafts 106, 108 because of the spinning of the first planet gears 118.

Second, we will assume the load or resistance acting on the first brake piston 22 and/or first output shaft 106 is greater than the load or resistance acting on the second brake piston 24 and/or second output shaft 108.

The apply direction torque or power from the motor 102 is transferred to the input gear 104, which causes the input gear 104 to rotate in an apply direction about axis A. Rotation of the input gear 104 causes the first carder 110 to rotate in an apply direction about axis A. Rotation of the first carrier 110 in the apply direction causes the first planet gears 118 to rotate about the axis A in the apply direction.

Because the load or resistance acting on the first brake piston 22 or first output shaft 106 is greater than the load or resistance acting on the second brake piston 24 or second output shaft 108, the first output shaft 106 and thus the first sun gear 120 slow or cease rotating. The slowing or ceasing of rotation of the first sun gear 120 causes the first planet gears 118 to spin about each of their corresponding axis A1, while the first planet gears 118 continue to rotate about axis A. By way of the engagement of the gear sections 124 on the first planet gears 118 and the gear sections 148 of the second planet gears 142, the second planet gears 142 also spin about their respective axis A1.

Rotation of the input gear 104 in the apply direction also simultaneously causes the second carrier 112 and thus the second planet gears 142 to rotate in an apply direction about axis A by way of the engagement of the ends 122, 126 and 146, 150 of the planet gears 118, 142, with the corresponding bores 128, 132 in the carriers 110, 112 as was discussed above.

Rotation of the second planet gears 142 about axis A and the spinning of the second planet gears 142 about axis A2 causes the second sun gear 144 to rotate about axis A, which causes the second output shaft 108 to continue to rotate about axis A, but at a higher speed due to the additional spinning of the planet fears 142.

Accordingly, the apply direction torque or power that was previously supplied to the first output shaft 106 and first brake piston 22 is instead distributed or redistributed to the second output shaft 108 and brake piston 24 to create the clamping force as was discussed above. This may result in the second output shaft 108 and corresponding rotary to linear stage mechanism 28b and brake piston 24 moving faster or having a different or higher speed compared to when the torque from the motor 102 is supplied generally equally to both output shafts 106, 108.

With continued reference to FIGS. 1-3, the following description refers to release of clamping force during a brake release. The deactivator 162 is configured to deactivate the distributing assembly 100 during release of the clamping force during a brake release so that the brake system 10 and/or distributing assembly 100 operates in an inactive condition.

A release direction torque (i.e., a torque output from the motor 102 that is opposite the apply direction torque) from the motor 102 is transferred to the input gear 104, which causes the input gear 104 to rotate in a release direction about axis A (i.e., in an opposite direction about axis A). Rotation of the input gear 104 about axis A in the release direction causes the first and second carriers 110, 112 to rotate in a release direction about axis A, due to the engagement of the ends 122, 126 of the first plant gears 118 and the ends 146, 150 of the second planet gears 142 with the corresponding bores 128, 132 defined in the corresponding carriers 110, 112 as discussed above.

The deactivator 162 or clutches 114, 116 are one-way members, or one-way bearings, an anti-reverse bearing, and/or a clutch bearing. Accordingly, when the input gear 104 is rotated in the release direction about axis A, the deactivator 162 or the clutches 114, 116 deactivate the distributing assembly 100 by restricting or preventing the free rotation of the first and second output shafts 106, 108 relative to the carriers 110, 112, regardless if the load or resistance acting on one of the output shafts 106, 108 or brake pistons 22, 24 is greater than the load or resistance acting on the other output shaft 106, 108 or brake piston 22, 24. Accordingly, during the release condition, the release direction torque is transmitted directly from the input gear 104 to the second output shafts 106, 108 so that the output shafts 106, 108 rotate about axis A as a solid axle in a release direction about axis A, regardless of any load or resistance differences acting on the first and/or second output shafts 106, 108 and/or brake pistons 22, 24.

Rotation of the first output shaft 106 the release direction about axis A causes the first spindle 30a to rotate about the axis S1 in a release direction by way of a suitable engagement between the first output shaft 106 and the first spindle 30a, such as a worm gear for example. Similarly, rotation of the second output shaft 108 the release direction about axis A causes the second spindle 30b to rotate about the axis S2 in the release direction by way of a suitable engagement between the second output shaft 108 and the second spindle 30b, such as a worm gear, for example.

Rotation of the first spindle 30a in the release direction about axis S1 causes the first nut 32a to move axially along axis S1 in a release direction by way of the threaded engagement between the first spindle 30a and the first nut 32a. The first nut 32a is restricted or prevented from rotating about axis S1. Similarly, rotation of the second spindle 30b in the release direction about axis S2 causes the second nut 32b to move axially along axis S2 in the release direction by way of the threaded engagement between the second spindle 30b and the second nut 32b. The second nut 32b is restricted or prevented from rotating about axis S2.

Axial movement of the first nut 32a in the release direction causes the first nut 32a to move away from a bottom pocket wall of the brake piston 22 so that the brake piston 22 can move away from the inboard brake pad 14 so that the inboard brake pad 14 can move away from the brake rotor to release the clamping force. Similarly, axial movement of the second nut 32b in the release direction causes the second nut 32b to move away from a bottom pocket wall of the brake piston 24 so that the brake piston 24 can move away from the inboard brake pad 14 so that the inboard brake pad 14 can move away from the brake rotor to release the clamping force.

Figures 4, 5:
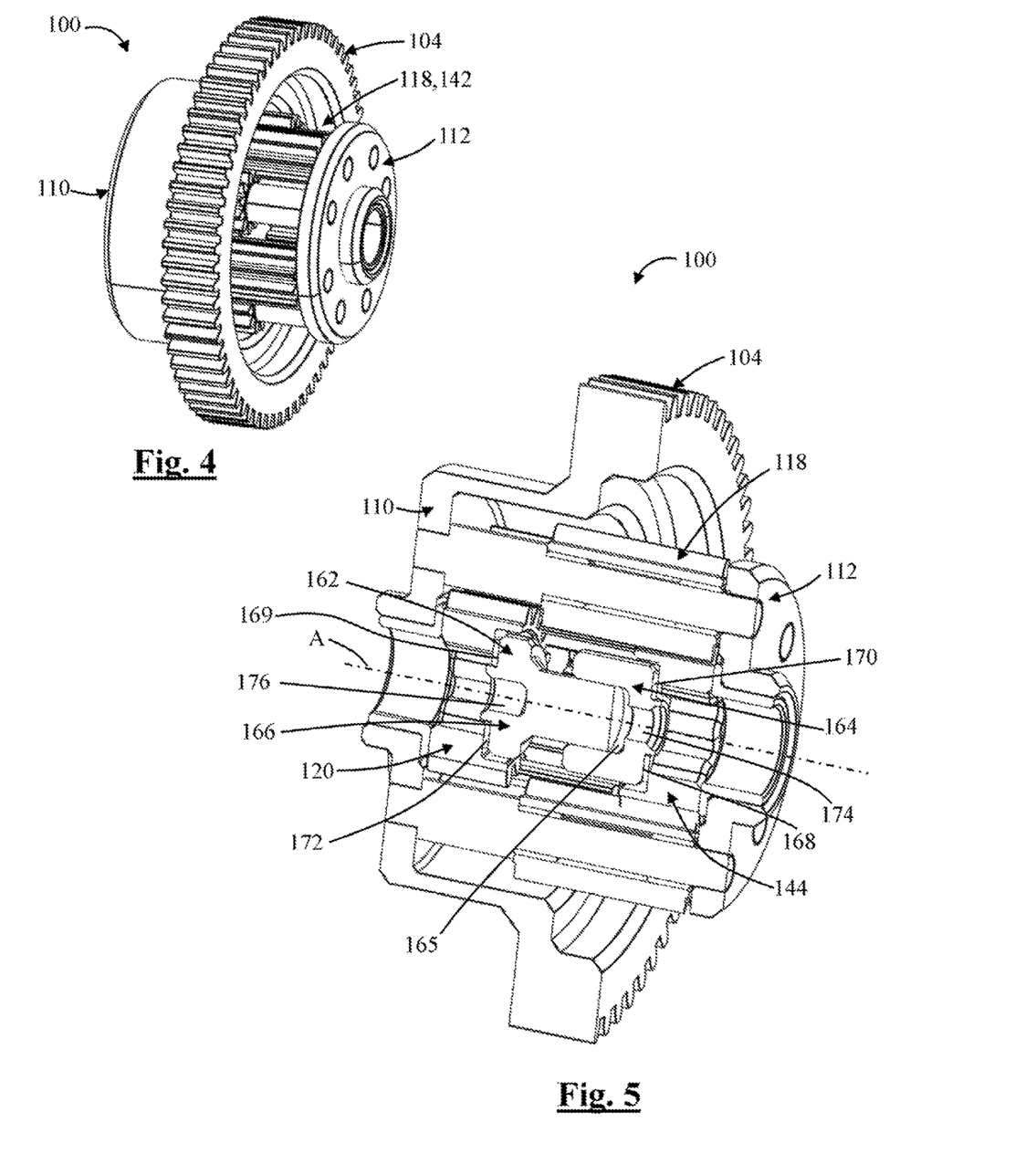
FIG. 4 is a perspective view of another distributing assembly for use with the brake system of FIG. 1.
FIG. 5 is a cross-sectional view of the distributing assembly of FIG. 4.

Another distributing assembly 100 is illustrated in FIGS. 4 and 5. The structure and function of the distributing assembly 100 in FIGS. 4 and 5 is substantially the same as the distributing assembly 100 illustrated and described in FIGS. 2 and 3. Therefore, in the interest of brevity, a description, function, and operation of many of the common elements between the two structures 100 will be omitted in the following paragraphs. A description and function of the omitted elements may be obtained by referring to one or more of the paragraphs herein.

Like the distributing assembly 100 of FIGS. 2 and 3, the distributing assembly 100 of FIGS. 4 and 5 comprises a first and second carrier 110, 112. Between the first and second carriers 110, 112, the distributing assembly 100 comprises first and second sun gears 120, 144 and a plurality of first and second planet gears 118, 142. As was described above with reference to FIGS. 1-3, the first and second sun gears 120, 144 are configured to engage the corresponding first and second output shafts 104, 106 (FIGS. 2 and 3) so that rotation of a sun gears 120, 144 about axis A causes the corresponding output shaft 106, 108 to also rotate about axis A.

The distributing assembly 100 of FIGS. 4 and 5 comprises a deactivator 162. During a brake apply to create or generate the clamping force, the brake system 10 and/or the distributing assembly 100 is configured to operate in an active condition. During release of the brake apply or clamping force, the deactivator 162 is configured to deactivate the distributing assembly 100 so that the brake system 10 and/or distributing assembly 100 operates in an inactive condition.

Active condition means that the brake system 10 and/or distributing assembly 100 is configured to distribute torque or power from the motor 102 generally equally to or between the two brake pistons 22, 24 or output shafts 106, 108 until one the brake pistons 22, 24 or output shafts 106, 108 experiences a higher load or resistance acting on it, and then the distributing assembly 100 distributes the torque from the motor 102 to the brake piston 22, 24 or output shaft 106, 108 with the lower resistance or load acting on it, while reducing or eliminating the torque supply to the brake piston 22, 24 or output shaft 106, 108 with the higher load or resistance acting on it. This results in the output with the lower resistance acting on it to move or rotate faster than the other output.

After the distributing assembly 100 is deactivated via the deactivator 162, the brake system 10 and/or distributing assembly 100 operates in the inactive condition, where the distributing assembly 100 is configured to distribute torque from the motor 102 generally equally to the two brake pistons 22, 24 or output shafts 106, 108, regardless if one the brake pistons 22, 24 or output shafts 106, 108 experiences a higher load or resistance acting on it compared to other brake piston 22, 24 or output shaft 106, 108. This results in both outputs or shafts rotating at the same speed, similar as if the outputs were a solid, connected shaft.

The deactivator 162 is configured to allow free rotation or selective rotation of the first output shaft 106 relative to the first carrier 110 in one direction about axis A when the distributing assembly 100 and/or brake system 10 is operating in the active condition during a brake apply or while creating the clamping force. The deactivator 162 is configured prevent the free rotation of the first output shaft 106 relative to the first carrier 110 in the opposite direction about axis A when the distributing assembly 100 and/or brake system 10 is operating in the inactive condition during a brake release or while releasing the clamping force.

The deactivator 162 is configured to allow free rotation or selective rotation of the second output shaft 108 relative to the second carrier 112 in one direction about axis A when the distributing assembly 100 and/or brake system 10 is operating in the active condition during a brake apply or while creating the clamping force. The deactivator 162 is configured prevent the free rotation of the second output shaft 108 relative to the second carrier 112 in the opposite direction about axis A when the distributing assembly 100 and/or brake system 10 is operating in the inactive condition during a brake release or while releasing the clamping force.

Free rotation or selective rotation means that when the first carrier 110 is rotated about axis A, the first output shaft 106 may or may not rotate with the first carrier 110 about the axis A. As will be discussed further below, the first output 106 will rotate with the first carrier 110 when the force or load or resistance acting on the first brake piston 22 is less than or equal to the force or load or resistance acting on the second brake piston 24. When the force or load or resistance acting on the first brake piston 22 is greater than the force or load or resistance acting on the second brake piston 24, the output shaft 106 will slow or cease rotating with the first carrier 110.

Preventing the free rotation means that the first output shaft 106 rotates with the first carrier 110 about the axis A when the first carrier 110 is rotated about axis A, regardless of the force or load or resistance acting on the first brake piston 22 compared to the second brake piston 24.

The deactivator 162 comprises a nut 164 and a shaft 166.

At one end of the nut 164, the nut comprises a pocket 165 that is configured to receive at least a portion of the shaft 166. The features of the shaft 166 and/or pocket 165 may be keyed together to restrict or prevent independent movement and/or rotation of the shaft 166 relative to the nut 164.

At the other end 168 of the nut 164, the deactivator 162 comprises an optional friction member 170 that is configured to directly, frictionally contact or engage the second sun gear 144. If the deactivator 162 does not include the friction member 170, then the end 168 of the nut 164 is configured to directly, frictionally contact or engage the second sun gear 144.

The nut 164 includes an engagement member 174 that is configured to engage an end of the second output shaft 108. The engagement member 174 may be any suitable feature configured to engage the output shaft 108, such as a recess or projection configured to engage a recess in the output shaft 108 or vice versa.

The shaft 166 comprises an optional friction member 172 that is configured to directly contact the first sun gear 120. If the deactivator 162 does not include the friction member 172, then the end 169 of the shaft 166 is configured to directly, frictionally contact the first sun gear 120.

The shaft 166 includes an engagement member 176 that is configured to engage an end of the first output shaft 106. The engagement member 176 may be any suitable feature configured to engage the output shaft 106, such as a recess or projection configured to engage a recess in the output shaft 106.

The shaft 166 and the nut 164 are configured to engage each other such that their relative position along the axis A does not change or is free from changing or varying. This means that the shaft 166 engages the nut 164 such that the relative distance or spacing between the friction members 172, 170 and/or the ends 168, 169 does not change. This means that the amount of contact or engagement between the friction members 172, 170 and/or the ends 168, 169 with the respective sun gear 120, 144 does not vary or change over time. This may be accomplished by the shaft 166 and nut 164 being press fit together; and/or by being locked together, for example, with an adhesive or fastener.

Creating the clamping force during a brake apply with the distributing assembly 100 of FIGS. 4 and 5 and the brake system of FIG. 1 is substantially similar to creating the damping force with the distributing assembly 100 of FIGS. 2 and 3 and the brake system of FIG. 1; therefore, in the interest of brevity, a description of creating clamping force during a brake apply with the distributing assembly 100 of FIGS. 4 and 5 and the brake system of FIG. 1 will not be repeated.

However, it should be noted that the friction force applied onto the sun gears 120, 144 via the friction members 172, 174 or the ends 169, 168 of the deactivator 162 is less than any load or resistance applied onto the brake pistons 22, 24 and/or output shafts 106, 108.

During release of the clamping force during a brake release, the deactivator 162 is configured to deactivate the distributing assembly 100 so that the brake system 10 and/or distributing assembly 100 operates in the inactive condition. During the inactive condition, the distributing assembly 100 is configured to distribute torque or power from the motor 102 generally equally to the two brake pistons 22, 24 or output shafts 106, 108, regardless if one the brake pistons 22, 24 or output shafts 106, 108 experiences a higher load or resistance acting on it compared to other brake piston 22, 24 or output shaft 106, 108. This means that both outputs 106, 108 will move or rotate at substantially the same speed or rate, which thus means the brake pistons should move in a release direction away from the brake rotor at substantially the same speed and rate. The deactivator 162 functions to deactivate the distributing assembly 100 by ensuring the friction force applied onto the sun gears 120, 144 by the friction members 172, 170 and/or ends 169, 168 is greater than or equal to a difference in the load or resistance acting on the first and second brake pistons 22, 24 and/or output shafts 106, 108. Accordingly, it is important that the friction force applied onto the sun gears 120, 144 by the friction members 172, 170 and/or ends 169, 168 remains constant and does not change over time.

Figure 6:
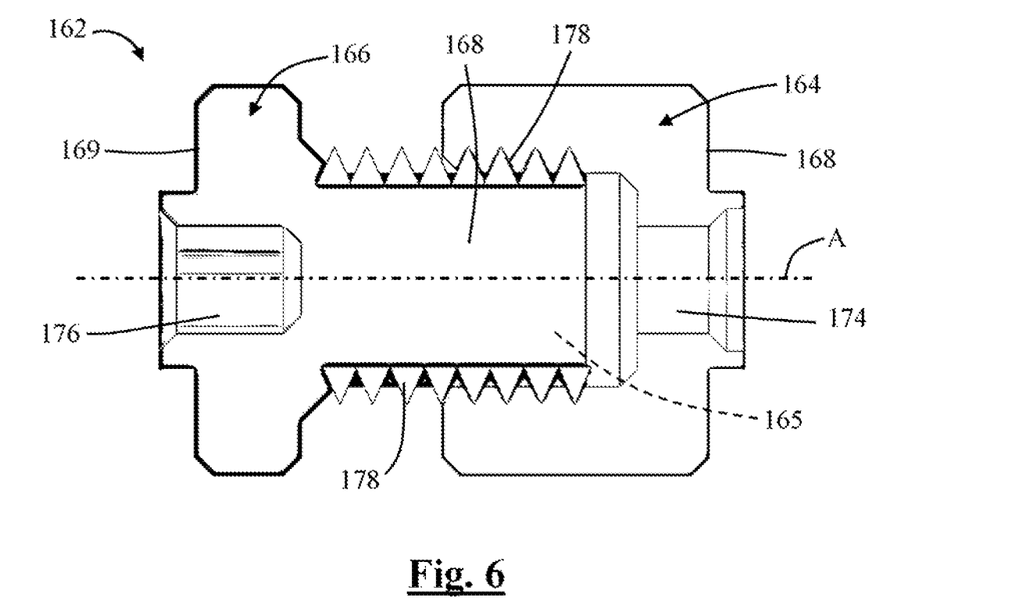
FIG. 6 is a cross-sectional view of a deactivator, for use with the distributing assembly of FIGS. 4 and 5.

FIG. 6 illustrates another deactivator 162. The deactivator 162 of FIG. 6 may replace the deactivator 162 of FIGS. 4 and 5 and/or elements of both mechanisms 162 may be combined. The deactivator 162 comprises a nut 164 and a shaft 166.

At one end of the nut 164, the nut comprises a pocket 165 that is configured to receive at least a portion of the shaft 166. The end 168 of the nut 164 is configured to directly, frictionally contact the second sun gear 144. The end 169 of the shaft 166 is configured to directly, frictionally contact the first sun gear 120. The ends 168, 169 may include friction members like the ones discussed above at FIG. 5.

The shaft 166 may include one or more engaging members 178 that are configured to engage or "bite" into the walls defining the pocket 165 so that the relative position between the shaft 166 and nut 164 the axis A does not change. This ensures that the distance between the ends 168, 169 does not change so that a constant friction force can be applied onto the sun gears 120, 144 (FIG. 5) so that the deactivator 162 can deactivate the distributing assembly 100 during release of the clamping force.

The engagement members 178 may also be configured to restrict or prevent independent movement or rotation of the shaft 166 relative to the nut 164, or vice versa.

Figure 7:
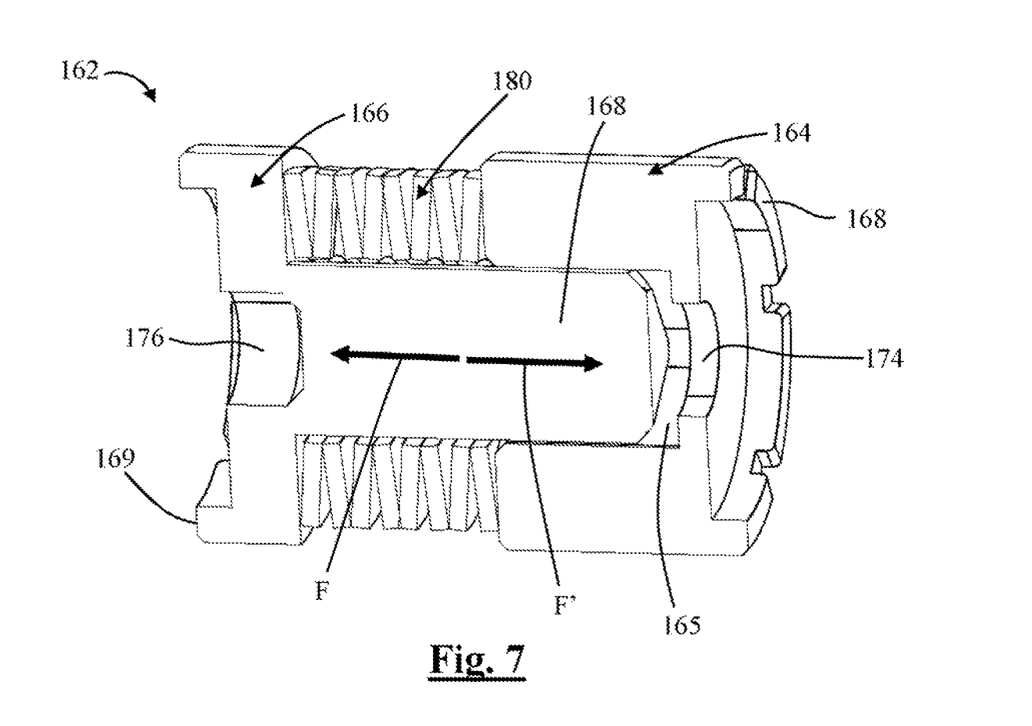
FIG. 7 is a cross-sectional view of a deactivator, for use with the distributing assembly of FIGS. 4 and 5.

FIG. 7 illustrates another deactivator 162. The deactivator 162 of FIG. 7 may replace the mechanism 162 of FIGS. 4 and 5 and/or FIG. 6 and/or elements of all three deactivators 162 may be combined.

Between the shaft 166 and the nut 164, the deactivator 162 comprises a biasing member 180 that is configured to apply opposing forces F, F' on the shaft 166 and nut 164 so that the corresponding ends 169, 168 of the shaft 166 and nut 164 contact or frictionally engage the respective sun gear 120, 144. This ensures that the distance between the ends 168, 169 does not change so that a constant friction force can be applied onto the sun gears 120, 144 (FIG. 5) so that the deactivator 162 can deactivate the distributing assembly 100 during release of the clamping force. The biasing member 180 may also be configured to restrict or prevent independent movement or rotation of the shaft 166 relative to the nut 164, or vice versa. The biasing member 180 may be a spring, a bevel spring that is arranged in a nested, inverted, or mixed stack.

The invention claimed is:

1. A brake system comprising:
   a first brake piston and a second brake piston;
   a motor;
   a distributing assembly that includes a first output and a second output, the distributing assembly distributes torque or power from the motor to the first brake piston via the first output and to the second brake piston via the second output; and
   a deactivator comprising a first end and a second end;
   wherein in a first operating configuration, the distributing assembly distributes the torque or power to both of the first output and the second output such that a speed of the first output and the second output varies,
   wherein in a second operating configuration, the deactivator is configured to deactivate the distributing assembly so that the distributing assembly distributes the torque or power to both of the first output and the second output such that the speed of the first output and the second output is generally the same, and wherein during the first operating configuration and the second operating configuration, the first end is arranged to apply friction on the first output and the second end is arranged to apply friction on the second output, and wherein a relative spacing between the first end of the deactivator and the second end of the deactivator is restricted from changing.

2. The brake system according to claim 1, wherein the deactivator comprises a nut and a shaft.

3. The brake system according to claim 2, wherein the nut comprises a pocket that receives at least a portion of the shaft.

4. The brake system according to claim 3, wherein the nut and the shaft are keyed together to restrict or prevent independent movement of the shaft relative to the nut.

5. The brake system according to claim 3, wherein the shaft comprises one or more engaging members that are configured to engage walls defining the pocket of the nut.

6. The brake system according to claim 3, wherein the deactivator comprises a spring provided between the nut and the shaft.

7. The brake system according to claim 1, wherein the deactivator comprises a biasing member arranged between the first end and the second end.

8. The brake system according to claim 1, wherein the deactivator comprises a first member and a second member, the first member carries the first end and the second member carries the second end, wherein one of the first member and the second member comprises one or more engaging features that are configured to engage the other of the first member and the second member so that a relative position between the first member and the second member is restricted from changing.

9. The brake system according to claim 1, wherein the deactivator comprises a first member and a second member, the first member carries the first end and the second member carries the second end, wherein the first member and the second member are press fit together, are locked together, or are connected together with an adhesive or fastener, so that a relative position between the first member and the second member is restricted from changing.

10. A method comprising:
applying a brake with a brake system that includes a distributing assembly by distributing torque or power between two or more brake pistons such that a speed of the each of the two or more brake pistons varies, and releasing the brake with the brake system by deactivating the distributing assembly with a deactivator and distributing the torque or power between the two or more brake pistons such that the speed of each of the two or more brake pistons is generally the same, wherein the deactivator comprises a first end arranged to contact a first output associated with a first brake piston of the two or more brake pistons and a second end arranged to contact a second output associated with a second brake piston of the two or more brake pistons, and wherein a relative spacing between the first end of the deactivator and the second end of the deactivator is restricted from changing.

11. The method according to claim 10, wherein the deactivator comprises a spring provided between the first end and the second end.

12. The method according to claim 10, wherein the deactivator comprises a first member and a second member, the first member carries the first end and the second member carries the second end, wherein one of the first member and the second member comprises one or more engaging features that are configured to engage the other of the first member and the second member so that a relative position between the first member and the second member is restricted from changing.

13. The method according to claim 10, wherein the deactivator comprises a first member and a second member, the first member carries the first end and the second member carries the second end, wherein the first member and the second member are press fit together, are locked together, are connected together with an adhesive or fastener, so that a relative position between the first member and the second member is restricted from changing.

14. The method according to claim 10, wherein the first end contacts the first output during one or both of the applying and the releasing steps.

15. The method according to claim 10, wherein the deactivator is situated between two opposing sun gears.

16. The method according to claim 10, wherein the deactivator comprises a shaft part that engages a nut part, and the shaft part is restricted from freely moving relative to the nut part.

17. The method according to claim 16, wherein the deactivator comprises a biasing member between the shaft part and the nut part.

\* \* \* \* \*